(12) United States Patent
Bernard et al.

(10) Patent No.: US 6,184,373 B1
(45) Date of Patent: Feb. 6, 2001

(54) METHOD FOR PREPARING CELLULOSE ACETATE FIBERS

(75) Inventors: Bobby Lynn Bernard, Rogersville; Max Ray Davis, Kingsport, both of TN (US)

(73) Assignee: Eastman Chemical Company, Kingsport, TN (US)

( * ) Notice: Under 35 U.S.C. 154(b), the term of this patent shall be extended for 0 days.

(21) Appl. No.: 09/389,732

(22) Filed: Sep. 3, 1999

(51) Int. Cl.$^7$ ...................................................... C07H 1/00
(52) U.S. Cl. .................... 536/58; 536/63; 536/64
(58) Field of Search ................................ 264/138, 289.6, 264/290.5, 344; 536/58, 63, 65

(56) References Cited

U.S. PATENT DOCUMENTS

| | | |
|---|---|---|
| 1,456,781 | 5/1923 | Kessler et al. . |
| 2,239,782 | 4/1941 | Haney . |
| 2,287,897 | 6/1942 | Martin . |
| 2,632,686 | 3/1953 | Bashford et al. . |
| 3,133,979 | 5/1964 | Russell . |
| 3,342,921 | 9/1967 | Brundige et al. . |
| 3,441,473 | 4/1969 | Brundige et al. . |
| 3,614,430 | 10/1971 | Berler . |
| 3,828,010 | 8/1974 | Davis et al. . |
| 3,842,007 | 10/1974 | Caputi, Jr. et al. . |
| 3,933,094 | 1/1976 | Murphy et al. . |
| 3,961,007 | 6/1976 | Caputi, Jr. et al. . |
| 4,040,856 | 8/1977 | Litzinger . |
| 4,047,862 | 9/1977 | Keith . |
| 4,192,838 | 3/1980 | Keith et al. . |
| 4,202,491 | 5/1980 | Suzuki . |
| 4,228,276 | 10/1980 | Kuo et al. . |
| 4,239,261 | 12/1980 | Richardson . |
| 4,274,914 | 6/1981 | Keith et al. . |
| 4,283,186 | 8/1981 | Keith et al. . |
| 4,460,647 | 7/1984 | Keith . |
| 4,504,084 | 3/1985 | Jauch . |
| 4,591,707 | 5/1986 | Stenzel et al. . |
| 4,736,425 | 4/1988 | Jalon . |
| 4,915,827 | 4/1990 | Rosenthal . |
| 5,055,500 | 10/1991 | Peters et al. . |
| 5,064,221 | 11/1991 | Miehe et al. . |
| 5,071,599 | 12/1991 | McNair, Jr. et al. . |
| 5,083,814 | 1/1992 | Guinta et al. . |
| 5,175,276 | 12/1992 | McNair, Jr. et al. . |
| 5,218,042 | 6/1993 | Kuo et al. . |
| 5,304,789 | 4/1994 | Lob et al. . |
| 5,331,140 | 7/1994 | Stephany . |
| 5,380,842 | 1/1995 | Itoh et al. . |
| 5,421,869 | 6/1995 | Gundjian et al. . |
| 5,460,646 | 10/1995 | Lazzouni et al. . |
| 5,505,888 | 4/1996 | Mitchell et al. . |
| 5,514,860 | 5/1996 | Berson . |
| 5,542,971 | 8/1996 | Auslander et al. . |
| 5,573,640 | 11/1996 | Frederick et al. . |
| 5,631,078 | 5/1997 | Ellery et al. . |
| 5,705,631 | 1/1998 | Malcolm . |

FOREIGN PATENT DOCUMENTS

| | | |
|---|---|---|
| 0 533 005 | 3/1993 | (EP) . |
| 0 711 512 | 5/1996 | (EP) . |
| 338214 | 11/1930 | (GB) . |
| 790039 | 1/1958 | (GB) . |
| 992740 | 5/1965 | (GB) . |
| 49-7518 | 1/1974 | (JP) . |
| 5-96231 | 8/1977 | (JP) . |
| 52-96208 | 8/1977 | (JP) . |

OTHER PUBLICATIONS

*Encyclopedia of Chemical Technology*, vol. 5, 3$^{rd}$ Edition, oo. 89–117 (1979).
Kurt Nassau, *The Physics and Chemistry of Color: The Fifteen Causes of Color*, pp. 4–19 (1983).
*Encyclopedia of Chemical Technology*, vol. 5, 4$^{th}$ Edition, p. 510 (1993).

*Primary Examiner*—Elli Peselev
(74) *Attorney, Agent, or Firm*—Cheryl Tubach; Harry Gwinnell (57) ABSTRACT

A method for producing an organic cellulose derivative fibrillated fiber includes the steps of mixing a cellulose ester containing stream and a coagulant stream in a first zone of relatively moderate turbulence to produce a slurry containing cellulose ester fibers, passing the slurry containing cellulose ester fibers to a second zone having relatively low turbulence for a sufficient time to increase the hardness of the cellulose ester fiber; and passing the cellulose derivative fibers through a third zone having relatively high shear to produce a fibrillated fiber having a diameter of about 0.5 to about 50 microns and a degree of fibrillation greater than about 6.

20 Claims, 6 Drawing Sheets

METHOD FOR PREPARING CELLULOSE ACETATE FIBERS

BACKGROUND OF THE INVENTION

1. Field of the Invention

This invention relates to the production of organic derivatives of cellulose, and particularly to a method for preparing organic derivatives of cellulose having a controlled degree of fibrillation or branching. More particularly, the invention relates to a method for producing cellulose acetate fibers having a degree of fibrillation greater than about 6. The fibrillated cellulose acetate may be used in the production of products typically constructed of cellulosic materials such as filter media, paper and paper products.

2. Background of the Invention

In the production of organic derivatives of cellulose, and especially organic esters of cellulose, such as cellulose acetate, cellulose formate, cellulose propionate and cellulose butyrate, the esterification of cellulose with an organic acid results in a solution of the derivative of cellulose in an acid solvent. For example, in making cellulose acetate, cellulose is acetylated by contacting a cellulosic material with acetic anhydride and a catalyst in the presence of a relatively large amount of acetic acid. The acetic acid dissolves the cellulose acetate that is formed, producing a very heavy and viscous solution, referred to herein as the "acid dope". Usually after hydrolysis, this solution of cellulose acetate is precipitated by adding water until the concentration of the acid reaches a point below which the acid will not hold the cellulose acetate in solution.

The isolation of cellulose acetate, or secondary cellulose materials, from organic solvent solutions, referred to herein as "solvent dope", has been extensively investigated. The known process for preparing cellulose acetate, i.e., a cellulose acetate with an approximate average degree of substitution of 2, with its acetylation and hydrolysis steps, results in a solution of the acetate in an acetic acid and water mixture. As noted above, the usual practice for precipitating cellulose acetate from the reaction mixtures obtained in the acetylation of cellulose, is to introduce a large volume of water into the reaction mixtures. A disadvantage of forming cellulose acetate in this way is that lumps of various sizes are precipitated. This adds to prolonged washing and subsequent handling procedures to purify the cellulose acetate.

Various techniques for isolating the cellulose acetate from that solution have resulted in cellulose acetate products in the form of powders, pellets or flakes. (See, for example, S. Gedon, R. Fengl, "Cellulose Ester, Organic". *Kirk-Othmer Encyclopedia of Chemical Technology*, 5$^{th}$ Edition, Volume 5, p. 510 (1993), John Wiley & Sons, Inc.) For various intermediate and end uses, the cellulose acetate products are generally dissolved in volatile organic solvents such as acetone and methyl ethyl ketone. The solutions can be placed on objects so that when the solvent evaporates, a thin film or coating of cellulose acetate remains on the object. Very concentrated solutions can be cast such that when the solvent evaporates, clear cellulose acetate sheets are the product. Forcing the concentrated cellulose acetate solutions through spinneret holes will result in a continuous fiber product. (See, for example, N. Eastman, et al., "Cellulose Acetate and Triacetate Fibers", Kirk-Othmer Encyclopedia of Chemical Technology, 3$^{rd}$ edition, Vol. 5, p. 105–108 (1979). John Wiley & Sons, Inc.) The fibers resulting from this spinning process are, in general, very long, regular, dense fibers. The fibers generally have a relatively constant diameter without kinks or curls in the fiber.

Attempts have been made to manufacture cellulose acetate fibers from the acetic acid dope with and without the use of such spinning technology. For example, U.S. Pat. No. 2,632,686 describes a process for wet spinning secondary cellulose acetate fibers from an acid dope and a process that will manufacture acetate films. The dope is extruded through a jet into an aqueous coagulating bath containing at least one metal salt as the coagulant medium. The examples in this patent show that the dope must be filtered and then deaerated for 6 hours before use. The fibers were made using 0.002 in. diameter spinnerets.

British Patent No. 790,039 describes a precipitation process in which the cellulose acetate-containing acid dope is extruded through apertures. The continuous filaments formed this way are allowed to fall freely through the air for a short distance before entering a hardening liquid. The filaments are allowed to fall through the liquid until they harden at least to the point where they will not coalesce or cohere on simple contact, then the fibers are deposited on a moving belt and carried to a cutter.

U.S. Pat. No. 1,456,781 describes a process for forcing an acetic acid solution of cellulose acetate through a filter screen and then through small orifices into a liquid capable of precipitating cellulose acetate in the form of an irregular mass of filaments.

U.S. Pat. No. 2,239,782 describes a similar process for the production of cellulose acetate fibers from acid dope. The equipment involves something similar to a horizontal continuous precipitator with the dope being moved from compartment to compartment while being diluted with precipitation liquids until the ester is precipitated as a fiber.

Although cellulose acetate fiber has been made for several decades, the conventional process requires that the cellulose acetate be first precipitated from the acetylation reaction solution, then re-dissolved in a volatile solvent, usually acetone or methylene chloride, to make a solvent dope from which the fiber is spun.

A number of methods have been described for preparing fibrets from cellulose acetate dopes. These usually involve precipitating the cellulose ester from a solvent ("dope") by the sudden addition of a "coagulant" which is miscible with the cellulose acetate solvent, but in which the cellulose acetate is insoluble. This is frequently accomplished by extruding the dope together with the coagulant into a region of high shear. While most of them mention that the fibers are fibrillated, there is no indication that the degree of fibrillation can be controlled or for that matter even measured.

In U.S. Pat. No. 3,842,007, cellulose acetate having a viscosity between 25 and 45 seconds, as measured according to ASTM D 1343-69, is dissolved in acetone to a solids concentration of 2–4% by weight. The polymer is subsequently precipitated by the addition of a large amount of water.

U.S. Pat. No. 3,961,007 discloses a method for making a fiber by feeding the cellulose acetate solution and the coagulating medium into a mixing T at velocities which create substantial turbulence and passing the resulting slurry immediately through a three blade impeller which shears the precipitated cellulose acetate to a surface area in the range of 35–55 m2/g. The fiber is claimed to resemble asbestos, and is useful as a filter medium.

U.S. Pat. No. 4,040,856 describes a process in which cellulose acetate, water, and a solvent are heated under pressure to form an emulsion which is "flashed" through a nozzle into a second vessel which is maintained at reduced pressure.

A number of references disclose making short, fine, cellulose acetate fibers by feeding a solution of the polymer dissolved in a solvent into a zone in which the solvent flashes. It is also known to make fibers by feeding a solution of dissolved polymer into a non-solvent under conditions of high shear. For example, in U.S. Pat. Nos. 3,342,921 and 3,441,473 small, opaque, cellulose ester fibers are produced by introducing a stream of a cellulose acetate-acetone-water solution through an atomizing spray nozzle into a stream of high pressure air. The resulting spray is allowed to fall into an agitated vessel which contains water, and the resulting fibers are recovered by filtration. The fibers are useful for increasing opacity of a paper.

U.S. Pat. No. 4,460,647 discloses a similar process, in which an inorganic opacifier such as titanium dioxide is added to the polymer solution prior to passing it through a spray nozzle.

U.S. Pat. Nos. 4,192,838; 5,175,276; 4,274,914; 4,283,186; and 5,071,599 all describe variations of the method where cellulose acetate dope is fed through a capillary into the throat of a venturi through which a coagulation liquid, such as water is passed.

EP 0 711 512 A2 discloses another approach to making small fibers where a cellulose acetate dope is fed through a nozzle, or series of nozzles, into a precipitating agent. The precipitated fiber is then subjected to a shearing force. The description of the apparatus shows the dope being fed through nozzles which are located concentrically in a pipe through which the coagulant is fed. A rotating cutting blade is located at or a short distance from the nozzle so that the dope stream is sheared into short lengths and fibrillated as it is extruded. The blade further introduces turbulence at the point at which the dope is coagulated.

U.S. Pat. No. 4,047,862 discloses a procedure in which the polymer is coagulated in a region of high shear by feeding a dope into a disk which contains nozzles on its periphery. The disk is rotated at a peripheral speed of at least 500 meters per second adjacent to a stationary annular wall located from $\frac{1}{16}$ to $\frac{1}{2}$ in. from the periphery of the disk. The disk and annular wall are immersed in the precipitating bath so that as the disk rotates it creates fibers via the shearing force created on the fiber by the precipitating bath.

Japanese SHO 52-96231 discloses a method for preparing acetylcellulose pulp. In the process a 5–20 weight percent acetylcellulose in a solvent of acetylcellulose is introduced into a stirred precipitating agent consisting of a 15–45 weight percent acetylcellulose solvent and water.

Japanese SHO 52-96208 describes a sheet consisting of 10–90 weight percent pulp produced by introducing, while stirring, a solution consisting of acetylcellulose with a concentration of 5–20 weight percent of acetylcellulose and a solvent of acetylcellulose into a precipitating solvent consisting of a solvent of acetylcellulose with 15–45 weight percent concentration of the solvent for acetylcellulose in water, and 90–100 weight percent short fibers, which are mixed, made into paper, pressed, and heated.

U.S. Pat. No. 5,705,631 describes the formation of fine cellulose acetate fibers by extruding the cellulose acetate-containing acid dope stream through an orifice or slit in a zone having a substantially laminar flow profile. This produces bands of fibers in which the individual fibers have a typical diameter of about 20 microns.

It is a characteristic of all of the foregoing processes, except that of U.S. Pat. No. 5,705,631, that the cellulose acetate dope is introduced directly into a coagulation zone under conditions of high shear. Control of the degree of fibrillation is apparently not possible, and the processes generally describe precipitating and re-dissolving polymer for the preparation of fibrets.

Despite such attempts to manufacture fibers of cellulose acetate from the acetic acid dope, a need remains for an economical and efficient process for making highly fibrillated cellulose acetate fibers. More importantly, a need exists for a process of manufacturing cellulose acetate fibers suitable for use in papermaking and other applications. The fibers should be prepared directly from the cellulose acetate-containing acid dope resulting from a typical cellulose acetylation and hydrolysis process.

SUMMARY OF THE INVENTION

Surprisingly, the present inventors have discovered a method by which a cellulose derivative fiber, and particularly a cellulose acetate fiber, can be produced directly using the acetylation "acid dope" to give very small, highly fibrillated fibers (also referred to herein as "fibrets"). These fibrets are particularly useful for blending with cellulose fibers to make paper which is especially suitable for ink jet printers, or for filter media.

In the broadest aspect of the invention, the method for preparing highly fibrillated fibers includes the steps of mixing a cellulose ester containing stream and a coagulant stream in a zone of relatively moderate turbulence to produce a slurry having from about 0.90 weight % to about 1.00 weight % of a cellulose derivative fiber; passing the slurry to a second zone having a relatively low turbulence for a sufficient time to at least partially harden the fibers; and passing the cellulose derivative fibers through a third zone having relatively high shear to produce a fibrillated fiber having an average degree of fibrillation greater than about 6.

In a preferred embodiment of the present invention, the process further includes the step of passing the fibrillated fiber to a low turbulence hardening zone for a time sufficient to effectively harden the fibrillated fiber to substantially prevent coalescence of the fibers in subsequent washing and recovery of the fibers.

It is an object of the present invention for providing a process to spin fibrets from the "acid dope" of normal secondary cellulose acetate production without prior precipitation and re-dissolving the cellulose acetate in a volatile solvent.

A further object of the invention is to provide a method for producing fibrets with a controllable degree of fibrillation.

Another object of the present invention is to provide a method for precipitating cellulose esters and particularly, cellulose acetate, from solution in the acetylation mixture, "acid dope", or a solvent, "solvent dope", in a continuous or semi-continuous operation mode.

These and other objects and advantages of the present invention will become more apparent to those skilled in the art in view of the accompanying drawings and detailed description which follow.

DETAILED DESCRIPTION OF THE INVENTION

Although the present invention will be described in greater detail with reference to the making of cellulose acetate fibers, one skilled in the art will understand that the present invention is applicable to producing fibers of other organic derivatives of cellulose such as the organic esters and ethers of cellulose, such as, for example, cellulose formate, cellulose propionate, cellulose butyrate, ethyl cellulose, methyl cellulose and benzyl cellulose.

Figure 1:
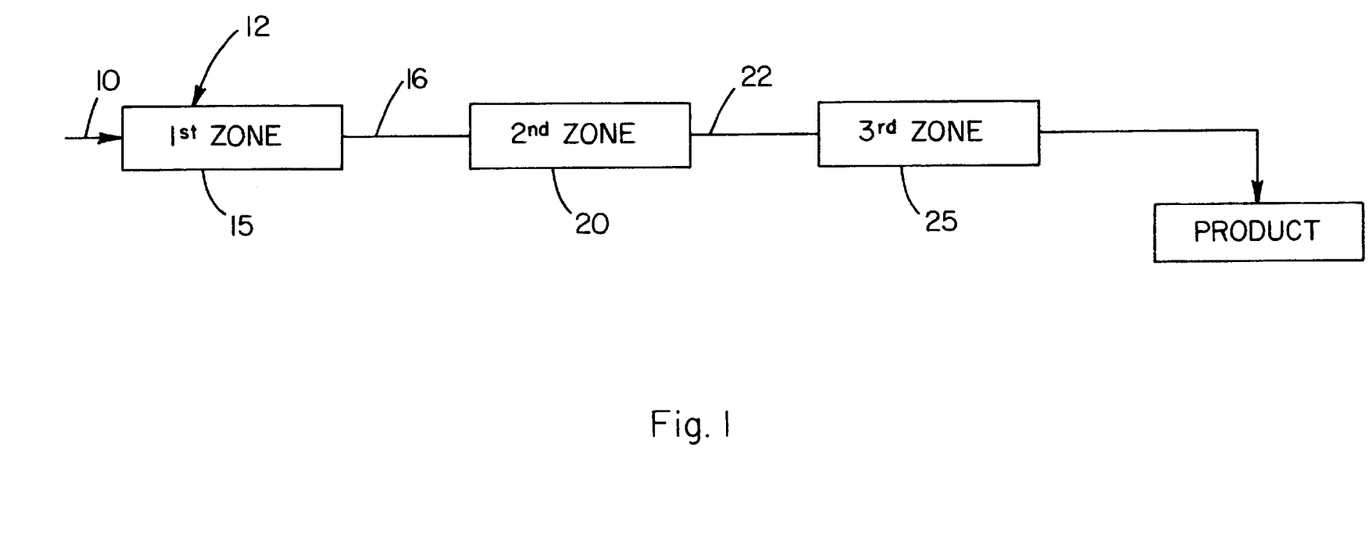
FIG. 1 is a schematic illustration of a process and apparatus to produce the fibers according to a preferred embodiment of the present invention.

Referring to FIG. 1, where a schematic of a preferred embodiment of the invention is illustrated, the method for preparing a fibrillated cellulosic derived fiber includes the steps of mixing a cellulose acetate containing stream 10 and a coagulant stream 12 in a first zone 15 to produce a slurry having from about 0.90 weight % to about 1.00 weight % of cellulose acetate fiber, passing the slurry via line 16 to a second zone 20 of relatively low turbulence for a sufficient time to produce additional shearing and hardening of the cellulose acetate fiber; and passing the cellulose acetate fibers via line 22 to a third zone 25 of relatively high shear to produce a fibrillated fiber. As used herein the phrase "fibrillated fiber" is used to mean a fiber having a surface area greater than about 10 $m^2/g$, a length of about 0.1 mm to about 50 mm, preferably from about 1 mm to about 30 mm and more preferably from about 2 mm to about 10 mm, and an average diameter of from about 0.5 microns to about 50 microns, preferably from about 0.5 to about 20 microns and more preferably from about 2 to about 10 microns. There is no particular limitation on the cross-sectional configuration of the fiber and can be, for example, round, oval, "X", "Y", "I", "H" or irregular.

As described above, the cellulose acetate containing stream 10 can either be an acid dope from the acetylation and hydrolysis of the cellulose from secondary cellulose acetate production, or a solvent dope from dissolving previously precipitated cellulose acetate from an acid dope. Such solvent dopes can be be prepared by dissolving the cellulose acetate in a good solvent, such as ketones, such as acetone, methyl ethyl ketone, carboxylic acids such as acetic acid, esters such as methyl acetate, ethyl acetate, methyl cellosolve acetate and ethyl cellosolve acetate. Generally, solvents employed include acetone, methyl ethyl ketone, acetic acid and mixed solvents such as dichloromethane-methanol, acetone-water, and acetic acid-water.

The acid dope stream can contain from about 5 to about 45 weight % of cellulose acetate and about 95 to about 55 percent by weight of a mixture of about 65 to about 90 weight percent acetic acid and about 35 to about 10 weight percent water. Preferably, the acid dope stream contains from about 8 to about 35 weight % cellulose acetate and about 92 to about 65 weight percent of the acetic acid/water mixture. The acetic acid/water mixture can vary from about 70 to about 90 weight percent acetic acid, more preferably about 75 to about 85 weight percent, with the balance being water. More preferably, the cellulose acetate dope used in the process contains from about 12 weight % to about 18 weight % cellulose acetate, 74% acetic acid, and the remainder water. As the preferred cellulose acetate containing stream is an acid dope stream coming directly from a cellulose acetylation/hydrolysis process, the acid dope stream may contain other components remaining from that process.

Cellulose acetate is soluble in concentrated acetic acid solutions such as present in the acid dope but looses its solubility as the acetic acid concentration decreases. The coagulation fluid or agent can be selected from among non-solvents or poor solvents for cellulose acetate, such as, water, alcohol and mixtures of water with solvents provided the mixture is richer in water than solvent. Desirably, the coagulation fluid contains a low concentration of acetic acid, desirably from about 25 to about 35 weight % acetic acid and about 75 to about 65 weight % water. Preferably, the coagulation fluid contains about 27 to about 33 weight % acetic acid and about 73 to about 67 weight % water, and more preferably, from about 29 to about 31 weight % acetic acid and about 71 to about 69 weight % water.

The cellulose acetate containing stream 10 and the coagulation stream 12 are mixed together in a first zone 15 of relatively moderate turbulence to form a slurry of precipitated cellulose acetate and aqueous constituents from the mixed streams. The type of extrusion die for extruding the cellulose acetate containing stream is not critical. For example, the extrusion die can have equally spaced holes, slits or can even be a capillary-like tube.

The turbulent manner of introducing the cellulose acetate solution and the coagulant into the precipitating zone is achieved by charging them as separate streams in a manner where the turbulence at the point at which they merge is relatively moderate. The precipitate is formed substantially instantaneously upon transition from the laminar flow regime to the turbulent flow regime.

Figure 2:
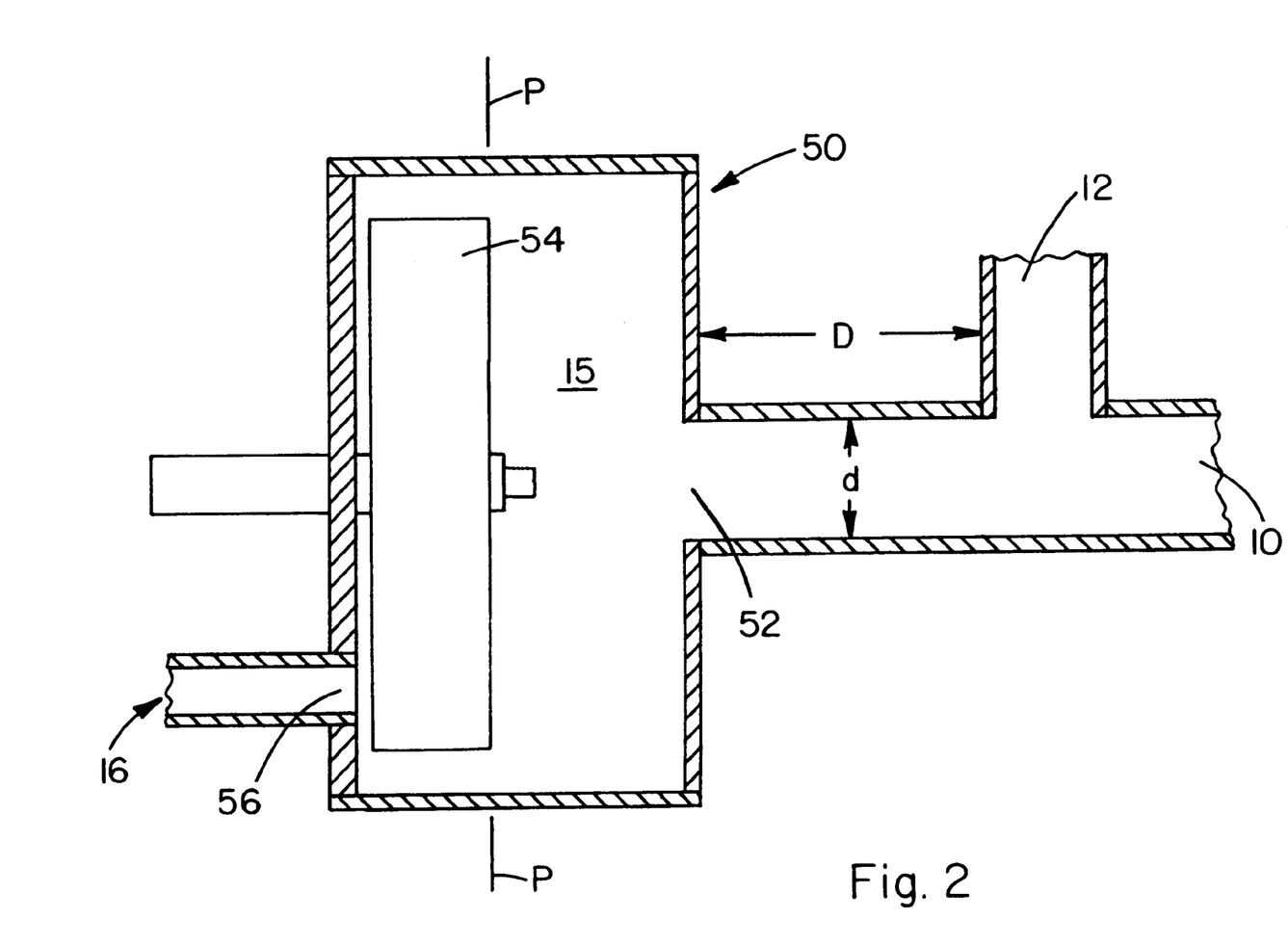
FIG. 2 is a cut-away, side view of a centrifugal pump used in the preferred embodiment of the invention.
Figure 3:
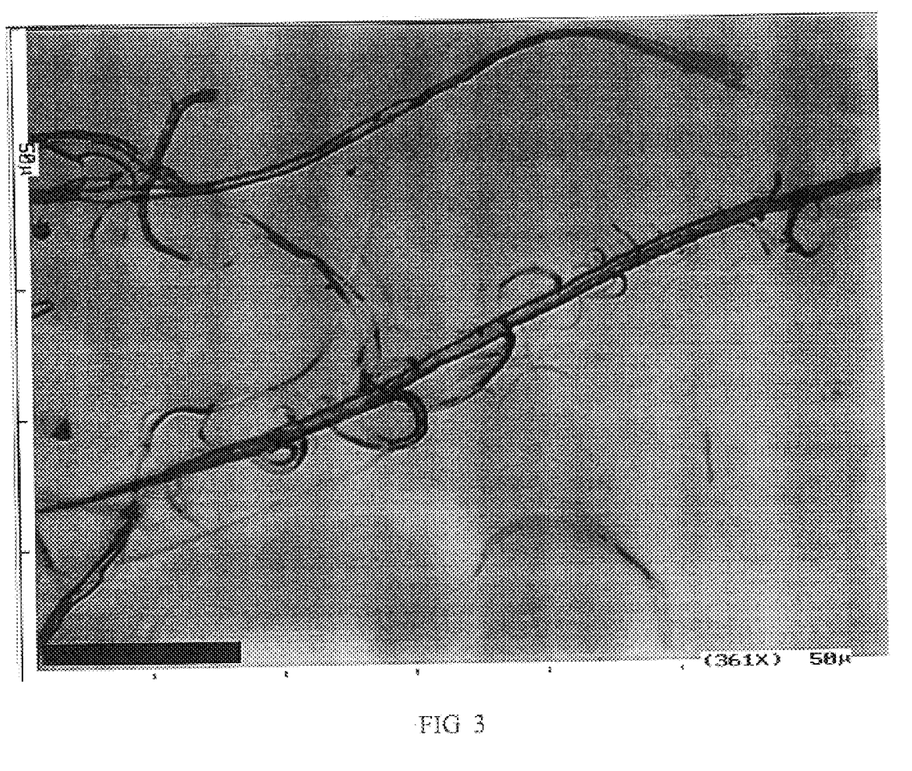
FIG. 3 is a photomicrograph of a fiber in accordance with the present invention.
Figure 4:
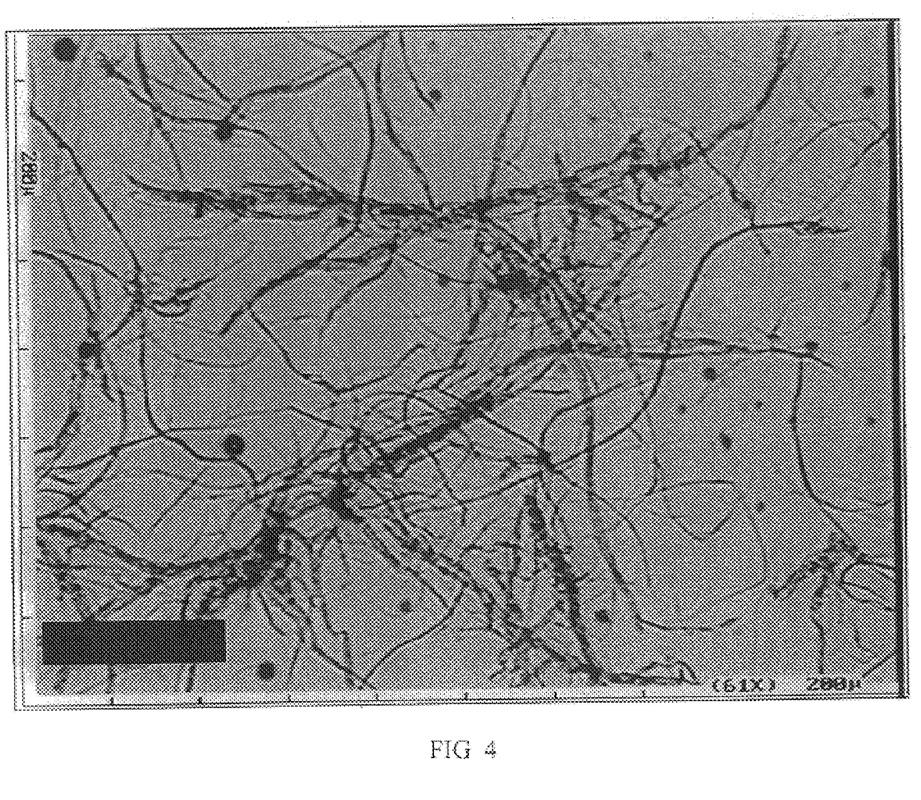
FIG. 4 is a photomicrograph illustrating an advantageous intermingling of fibers made in accordance with the present invention.
Figure 5:
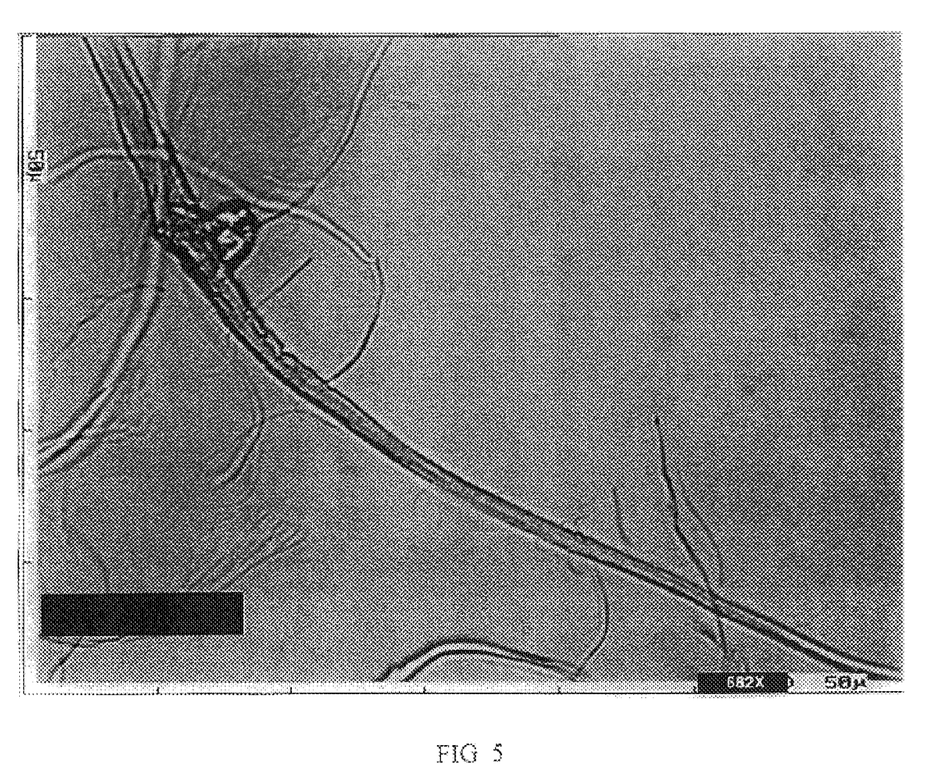
FIG. 5 is a photomicrograph of a fiber that is not in accordance with the present invention and having a degree of fibrillation of less than 6.
Figure 6:
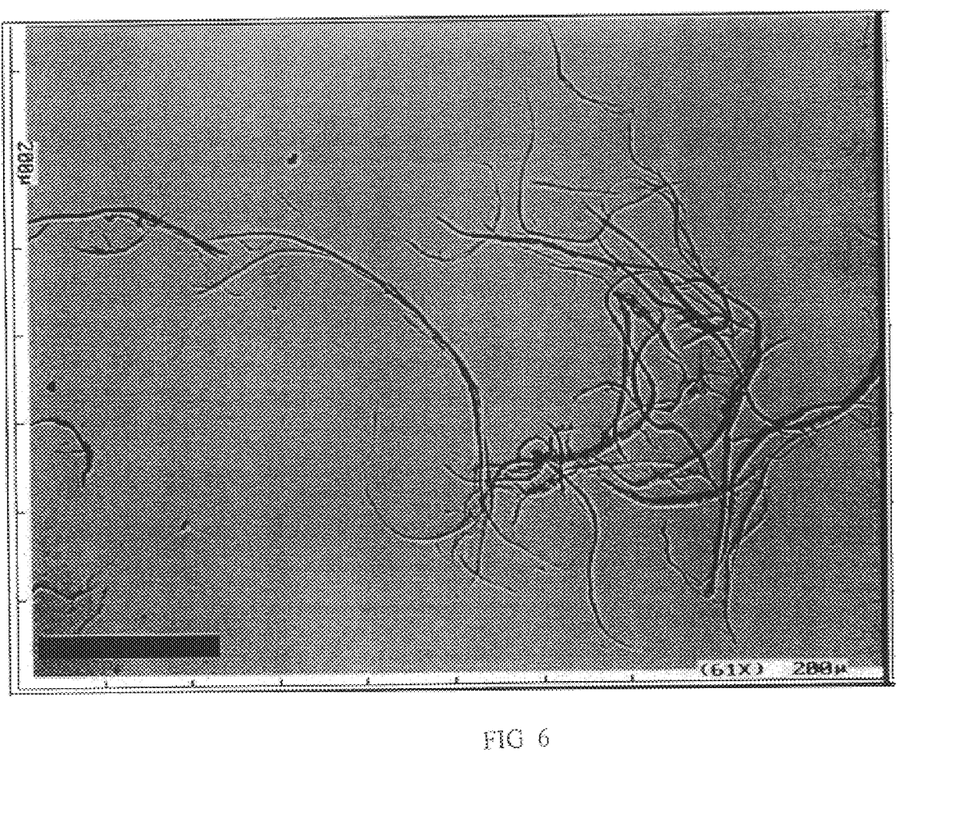
FIG. 6 is a photomicrograph illustrating how the fibers shown in FIG. 5 are not easily intermingled and would require other methods for matting fibers.

It has been found that a particularly advantageous action may be obtained by bringing the components together in a quickly flowing stream in a pipe line, which at the same time includes a mixing apparatus that will provide a region or zone of moderate turbulence. Desirably, the mixing apparatus is a centrifugal pump having an increased residence time and/or back mixing. Referring to FIG. 2, in a preferred embodiment of the invention, first zone 15 includes a centrifugal pump 50 having an inlet port 52, an impeller 54, and an effluent port or opening 56. The impeller provides turbulence and mixing energy to the cellulose acetate containing stream 10 and coagulation stream 12 for precipitating the cellulose acetate. To achieve a uniform residence time, desirably, the effluent port 56 is positioned perpendicular to and behind plane vertical "P" of the impeller 54. Alternatively, there may be provided a line or recycle loop on the pump discharge for permitting a portion of the discharged material to be recycled into the suction port of the pump, (not shown). Due to the high speed of the rotation obtainable in a centrifugal pump, intimate mixing may be achieved using smaller quantities of the coagulating fluid relative to using a mixing vessel. To assist in the mixing of the cellulose acetate containing stream 10 and the coagulation stream 12 under relatively moderate turbulent conditions, the coagulation stream 12 contacts the cellulose acetate containing stream 10 a distance, "D", equal to about 1 to about 10 inlet pipe diameters "d" and preferably, a distance equal to about 1 to about 5 inlet pipe diameters before entering the pump. During the rapid rotary movement of the mixing vane, very small portions of cellulose acetate solution are continuously spun off and intimate admixture of the precipitation liquid is effected. Advantageously, the cellulose acetate containing stream and the coagulant stream have a short residence time in the turbulent flow zone to produce cellulose acetate fibers. As used herein the phrase "relatively moderate turbulent conditions" is used to mean flow conditions wherein the Reynolds number is from about 4000 to about 10,000. Flow conditions having Reynolds numbers lower or higher than this are considered herein as low and high turbulent conditions, respectively.

The weight ratio of the coagulation stream to the cellulose acetate containing stream is at least 9:1, preferably 15:1 and more preferably 20:1. One skilled in the art will understand the amount of coagulation stream used depends upon the acid concentration in that stream, the acid concentration and amount of the cellulose acetate containing stream, and the desired acid concentration of the mixture stream resulting from the coagulation stream and the cellulose acetate containing stream diffusing together. Enough of the coagulation stream must be used to precipitate the cellulose acetate so that the resulting stream has a low enough acetic acid concentration to precipitate the cellulose acetate. Moreover, the final acetic acid concentration should not be so high as to partially solubilize the cellulose acetate, interfering with fiber precipitation.

The temperature at which precipitation of the cellulose acetate fibrets is carried out is generally not critical. The temperature of the cellulose acetate containing stream 10 fed to the inlet 52 of the pump can be from about 55° C. and 85° C., and the temperature of the coagulation stream 12 can be from about 35° C. to about 50° C. Desirably, the temperature of the cellulose acetate containing stream 10 and the temperature of the coagulation stream 12 have a temperature difference of about 10° C. and more preferably have a temperature difference of about 5° C. Desirably, the centrifugal pump is also at a temperature of about 45° to about 60° C.

The precipitated cellulose acetate fibers are fed under pressure of the pump 50 via line 16 to a second zone 20 of relatively low turbulence. The second zone 20 can be any containment vessel and/or piping that permits the cellulose acetate precipitate slurry to be maintained at a relatively low turbulence for a period of time sufficient for the fibers to increase their hardness sufficiently to prevent the pressure exerted on them in the high shearing zone to cause agglomeration of the fibers. However, it is undesirable for the fibers to be completely hardened at this stage since this would cause considerable difficulty in shearing the fibers later. Typically, the precipitate slurry is maintained at a relatively low turbulence for a time of about 0.5 minutes to about 5 minutes and preferably from about 1 minute to about 3 minutes.

The partially hardened fibers are transferred from the second zone 20 via line 22 to a third zone 25. The third zone 25 includes a mechanical shear apparatus which, using high shear, shears the cellulose acetate fibers to form a slurry having highly fibrillated fibers. The fibrillated fibers desirably have a surface area greater than about 12 m$^2$/g and preferably have a surface area of about 12 m$^2$/g to about 35 m$^2$/g. Moreover, the fibers have a degree of fibrillation greater than about 6. Desirably, the fibers also have a shive of less than about 10% per sample analysis with less than about 5% being preferred. Shives are determined by using a shive analyzer available from Pulmac Instruments International, Montpelier, Vt. As can be seen from FIGS. 3–6, an advantage of the present method for producing fibrillated fibers is that the fibers have a degree of fibrillation or branching greater than about 6 and a diameter of from about 0.5 to about 50 microns, and preferably a diameter of from about 2 microns to about 10 microns. The term "degree of fibrillation" is used herein to describe a fiber having at least 6 nodes or branches from the fiber per 50 microns of fiber length. Preferably, the fibers have less than about 10% shives per sample analysis, more preferably less than about 5% shives per sample analysis and most preferably less than about 3% shives per sample analysis.

In a preferred embodiment of the present invention, the process includes passing the fibrillated fibers slurry to a hardening tank for a period of time sufficient for the cellulose acetate fibers to harden for subsequent filtration and water washing of the fibrillated fibers to remove residual acid. The hardening tank is sized so the fibrillated fibers can be gently agitated for a period of from about 5 to about 60 minutes and preferably from about 5 to about 30 minutes. The temperature of the material in the hardening tank is from ambient to about 75° C. and preferably from ambient to about 50° C. On entering the hardening liquid the fibrillated fibers are allowed to be gently agitated until their surfaces are sufficiently hardened so that the fibers will not adhere or become agglomerated on simple contact with each other or when subsequently filtered.

The hardening liquid is typically a non-solvent for the cellulose acetate or other cellulose ester. When the cellulose acetate is being precipitated from the acid dope solution, the hardening liquid may be water or a dilute aqueous solution of a lower aliphatic acid containing up to about 50 weight % of the acid and preferably less than about 30 weight % of the acid. Sufficient hardening liquid is brought into contact with the fibers to effect the desired degree of hardening and to avoid building up the concentration of the acid in the hardening liquid to a point where it would tend to dissolve or soften the cellulose ester. The advantage of dividing the precipitation and fibrillation into zones is that a definite step takes place in each zone.

The hardened fibrillated cellulose acetate fibers may be collected, separated, and washed using techniques known in the art. For example, the stream containing the precipitated cellulose acetate fibers may be collected in a filter tank. The fibers may then be washed with water to remove any acid, and dried in air or with heating. Alternatively, the stream may be flowed onto a belt filter having a moving screen to collect the precipitated cellulose acetate fibers. Suction may be applied to remove any liquid from the fibers. The fibers may be sprayed with water, which may also be removed by suction, to wash away any remaining acid. The washed fibers may then be dried, again with known techniques such as air drying or heated drying. Preferably, a conventional belt filtration system is used in conjunction with counter current washing in order for the filtrate recycle stream, which is comprised of about 30% acetic acid in water, to be recycled to the process, (not shown).

The following examples are for illustration purposes only and serve to provide a better understanding of the invention and as such are not to be construed as limiting the invention to what is disclosed therein.

EXAMPLES 1–5

In the following examples a cellulose acetate acid dope was prepared having 18 weight % solids, 71 weight % acetic acid and 10 weight % water using techniques known to those skilled in the art. The acid dope was injected into a centrifugal WEMCO Model E non-clogging vortex-type pump available from Enviro Tech Pump systems. The cellulose acetate acid dope feed rate was from 4–6 lb./min. and coagulation fluid (weak acid) feed rate was from 9–13.5 gal/min. The WEMCO pump had been modified for the discharge port to be in back of the plane of the impeller to allow a greater residence time within the pump before further processing occurred. The effluent from the pump was then passed through a smooth pipe of sufficient length to provide a holdup time of about two minutes.

The cellulose acetate fibers were then sheared using two DISPAX high shear mixers (available from IKA Works, Inc., 2635 North Chase Parkway, Southeast, Wilmington, N.C. 28405-7499) to reduce the fiber length and break up any clumps of cellulose acetate fibers.

Effluent from the high shear mixer was passed into a hardening tank in which the mixture was gently agitated for about 30 minutes and held at approximately ambient temperature in order to harden the fibrets. The hardening process involves diffusion of acetic acid from the fibrets so that they will not stick together or clump after they are filtered and dried.

The fibrets were then filtered in conventional manner using a belt filter available from Pannevis Inc., 40 Pier Lane West, Fairfield, N.J. 07004.

The run conditions of each example appear in Table 1 below and the resulting fibrillated fibers produced under the specified conditions are delineated in Table 2 below.

the present invention. It is to be understood that all patents, patent applications, and other references described above are incorporated herein by reference for any disclosure pertinent to the practice of the present invention.

We claim:

1. A method for producing an organic cellulose derivative fibrillated fiber comprising;

a. mixing a cellulose ester containing stream and a coagulant stream in a first zone of relatively moderate turbulence to produce a slurry containing cellulose ester fibers, wherein said first zone of moderate turbulence is produced by a centrifugal pump;

b. passing said slurry containing cellulose ester fibers to a second zone having relatively low turbulence for a sufficient time to increase the hardness of said cellulose ester fiber; and c. passing said cellulose derivative fibers through a third zone having relatively high shear to produce a fibrillated fiber having a degree of fibrillation greater than about 6.

TABLE 1

| | Example No. | | | | |
|---|---|---|---|---|---|
| Variable Description | 1 | 2 | 3 | 4 | 5 |
| Acid dope feed rate (lbs/min) | 4.0 | 4.0 | 6.0 | 6.0 | 6.0 |
| Acid dope temperature of at injection (° C.) | 71.0 | 71.0 | 50.4 | 62.0 | 67.0 |
| Acid dope viscosity at injection (Kcp) | 10.3 | 9.9 | 12.0 | 10.0 | 10.0 |
| Weak acid flow rate (gpm) | 9.0 | 9.0 | 13.5 | 13.5 | 13.5 |
| Weak acid concentration (%) | 31.08 | 30.79 | 31.02 | 31.13 | 31.04 |
| Weak acid temperature (° C.) | 55 | 45 | 43 | 54 | 54 |
| WEMCO pump speed | 2400 | 3200 | 300 | 3000 | 3000 |
| Dispax #1 speed | 3500 | 3500 | 3500 | 3500 | 3500 |
| Dispax #2 speed | 2000 | 2000 | 3500 | 3500 | 3500 |

TABLE 2

| | Example No. | | | | |
|---|---|---|---|---|---|
| Fiber Analysis | 1 | 2 | 3 | 4 | 5 |
| Surface Area($m^2$/g) | 10.8 | 12.0 | 17.0 | 13.9 | 13.4 |
| CSF (ml) | 697 | 565 | 615 | 556 | 536 |
| Shives (%) | 2.84 | 0.43 | 12.27 | 1.05 | 0.86 |
| Bauer-McNett Analysis 16 Mesh (%) | 0.105 | 0.012 | 1.727 | 0.013 | 0.008 |
| Bauer-McNett Analysis 30 Mesh (%) | 25.44 | 10.232 | 39.060 | 13.952 | 11.032 |
| Bauer-McNett Analysis 50 Mesh (%) | 44.349 | 44.890 | 34.017 | 40.525 | 43.488 |
| Bauer-McNett Analysis 100 Mesh (%) | 18.421 | 24.824 | 16.867 | 25.566 | 25.727 |
| Bauer-McNett Analysis 200 Mesh (%) | 7.0960 | 10.728 | 7.0190 | 11.670 | 11.189 |
| Fines (%) | 4.589 | 9.310 | 1.310 | 8.274 | 8.556 |

The fibers according to the present invention are useful by themselves or in a variety of mixtures, composites, and the like. They have particularly advantageous properties for mixing with various cellulose-containing pulp and other fibers, and even more particularly they provide for an advantageous paper comprising cellulose, cellulose esters, with or without mineral pigments and/or plasticizers.

The present invention has been described above in detail, with particular attention given to the preferred embodiment. It will be appreciated by those of skill in the art that various modifications can be made to the above described process and apparatus in order to prepare fibers within the scope of the present invention. Furthermore, it is to be understood that cellulose esters other than cellulose acetate, such as cellulose propionate, can be made by a process according to 2. The method of claim 1 further comprising transferring said fibrillated fibers to a fourth zone having a relatively low turbulence for a period sufficient for the cellulose fiber to harden.

3. The method of claim 2 further comprising recovering said hardened fibrillated fiber.

4. The method of claim 1 wherein said cellulose ester containing stream is an acid dope from a hydrolysis step of a cellulose acetate process.

5. The method of claim 1 wherein said cellulose ester containing stream is a solvent dope.

6. The method of claim 1 wherein said cellulose ester containing stream includes from about 5 weight % to about 45 weight % of said cellulose ester, from about 95 weight % to about 55 weight % of an aliphatic acid and from about 35 to about 10 weight % water.

7. The method of claim 1 wherein the amount of coagulation stream mixed with said cellulose ester containing stream is greater than about 10:1.

8. The method of claim 1 wherein the amount of coagulation stream mixed with said cellulose ester containing stream is from about 15:1 to about 20:1.

9. The method of claim 1 wherein said cellulose ester containing stream includes cellulose acetate.

10. The method of claim 1 wherein said coagulation stream comprises from about 25 to about 35 weight % of an aliphatic acid and about 75 weight % to about 65 weight % water.

11. The method of claim 10 wherein said cellulose ester is selected from the group consisting of cellulose acetate, cellulose butyrate, cellulose propionate, and mixtures thereof.

12. The method of claim 1 wherein said fibrillated fiber has less than about 5 % shives per sample analysis.

13. The method of claim 1 wherein said fibrillated fiber has a mean diameter of from about 0.5 to about 50 microns and a length of from about 0.1 to about 50 mm.

14. The method of claim 13 wherein said fibrillated fiber has a mean diameter of from about 2 to about 10 microns.

15. A method for producing a fibrillated cellulose acetate fiber comprising;
  a. mixing a cellulose acetate acid dope stream and a coagulant stream in a first zone of relatively moderate turbulence to produce a slurry containing cellulose acetate fibers, wherein said first zone of moderate turbulence is produced by a centrifugal pump; b. passing said slurry containing cellulose acetate fibers to a second zone having relatively low turbulence for a sufficient time to increase the hardness of said cellulose acetate fibers;
  c. passing said cellulose acetate fibers through a third zone having relatively high shear to produce fibrillated fibers having a mean diameter of about 0.5 to about 20 microns and a degree of fibrillation greater than about 6; and
  d. transferring said fibrillated fibers to a forth zone having a relatively low turbulence for a period sufficient for the cellulose acetate fiber to harden.

16. The method of claim 15 wherein said coagulation stream comprises from about 26 to about 36 weight % acetic acid and from about 74 weight % to about 64 weight % water.

17. The method of claim 15 wherein the amount of coagulation stream mixed with said cellulose acetate containing stream is greater than about 10:1.

18. The method of claim 15 wherein the amount of coagulation stream mixed with said cellulose acetate containing stream is from about 15:1 to about 20:1.

19. The method of claim 15 wherein said fibrillated fiber has less than about 3 % shives per sample analysis.

20. A method for producing a fibrillated cellulose acetate fiber comprising;
  a. mixing an acid dope stream from a hydrolysis step of a secondary cellulose acetate process and a coagulant stream in a first zone of relatively moderate turbulence to produce a slurry containing cellulose acetate fibers, wherein said first zone of moderate turbulence is produced by a centrifugal pump;
  b. passing said slurry containing cellulose acetate fibers to a second zone having relatively low turbulence for a time of about 0.5 minutes to about 5 minutes to increase the hardness of said cellulose acetate fibers;
  c. passing said cellulose acetate fibers through a third zone having relatively high shear to produce fibrillated fibers having a mean diameter of about 2 to about 10 microns, a degree of fibrillation greater than about 6 and less than about 5 % shives per sample analysis; and
  d. transferring said fibrillated fibers to a forth zone having a relatively low turbulence for a time of about 5 minutes to about 60 minutes for the cellulose acetate fiber to harden.

* * * * *